United States Patent [19]
Weber et al.

[11] Patent Number: 5,468,046
[45] Date of Patent: Nov. 21, 1995

[54] SEAT BELT MOUNTING FOR INTEGRAL CHILD SEAT

[75] Inventors: James L. Weber, W. Bloomfield; Dianna L. Sabo, Novi, both of Mich.

[73] Assignee: Hoover Universal, Inc., Plymouth, Mich.

[21] Appl. No.: 274,253

[22] Filed: Jul. 13, 1994

[51] Int. Cl.⁶ .................................................. A47C 15/00
[52] U.S. Cl. .................... 297/238; 297/216.11; 297/256; 297/468; 297/484
[58] Field of Search ........................... 297/238, 484, 297/467, 14, 468, 216.11, 256

[56] References Cited

U.S. PATENT DOCUMENTS

| | | | |
|---|---|---|---|
| 4,400,014 | 8/1983 | Takada | 297/468 |
| 4,540,216 | 9/1985 | Hussel | 297/238 |
| 4,557,523 | 12/1985 | Motonami et al. | 297/468 |
| 5,385,384 | 1/1995 | Gierman et al. | 297/216.11 |

*Primary Examiner*—Kenneth J. Dorner
*Assistant Examiner*—Anthony D. Barfield
*Attorney, Agent, or Firm*—Harness, Dickey & Pierce

[57] ABSTRACT

An integral child seat in which the lap belt of the restraint system is attached to opposite sides of the rotating child seat support, forward of the rotational axis of the seat support. By attaching the belts to the seat support forward of the rotation axis, the lap belt will remain snugly fitting to the seat occupant's lap and have a reduced tendency to ride over the iliac crest of the seat occupant's pelvis during a vehicle collision.

9 Claims, 3 Drawing Sheets

SEAT BELT MOUNTING FOR INTEGRAL CHILD SEAT

BACKGROUND AND SUMMARY OF THE INVENTION

The present invention relates to a child seat integrally formed within a vehicle seat assembly and in particular to a seat belt mounting for the integral child seat.

Numerous vehicle seat assemblies have been developed having what is known as an integral child seat therein. The integral child seat typically has one or more cushion members which are movably attached to the vehicle seat assembly and enable the seat to be used either by an adult or by a child requiring special features such as a booster seat and a separate restraint system. Many integral child seats have a lower seat support which is rotatably mounted to the seat back of the vehicle seat assembly. The lower seat support is rotatable about a transverse axis at the base of the seat back and has a stowed position within the seat back and a use position in which it extends forward, generally horizontally.

When the seat support is in the stowed position, an adult can sit in the seat assembly. When the seat support is in the use position, a child can sit in the seat assembly. Integral child seats also include a belt restraint system for the child occupant. A five point restraint system is often used, having a pair of belts. Each belt is attached at one end to opposite sides of the lower seat support and extend upward over the occupant's shoulders. Each belt has a clasp which is insertable into a buckle between the seat occupant's legs thus forming lap belts and shoulder belts from the buckle, over the occupant's shoulders.

The present invention relates to the attachment of the belts at the right and left sides of the lower seat support. It is one object of the present invention to provide a belt attachment which lowers the lap belt as it extends over the wearer's lap to help prevent the lap belt from riding over the lilac crest of the seat occupant's pelvis. By doing so, the forces applied to the seat occupant during a vehicle collision are applied to the occupant's pelvis as opposed to the soft abdominal tissue above the pelvis.

The improved placement of the lap belt is accomplished by moving the attachment point of the belts forward from the lower seat support pivot axis. This results in a lap belt which extends from the buckle transversely, over the user's legs, and then down to the lower seat support rather than extending rearwardly from the buckle toward the pivot axis. The ends of the lap belts are attached to belt anchor brackets mounted to the sides of the lower seat support. The belt anchor brackets, in a preferred embodiment, include rearwardly extending mounting portions to mount the belt anchors to the seat back of the seat assembly, thereby rotatably mounting the lower seat support to the seat back as well.

Further objects, features and advantages of the invention will become apparent from a consideration of the following description and the appended claims when taken in connection with the accompanying drawings.

DETAILED DESCRIPTION OF THE PREFERRED EMBODIMENT

Figure 1:
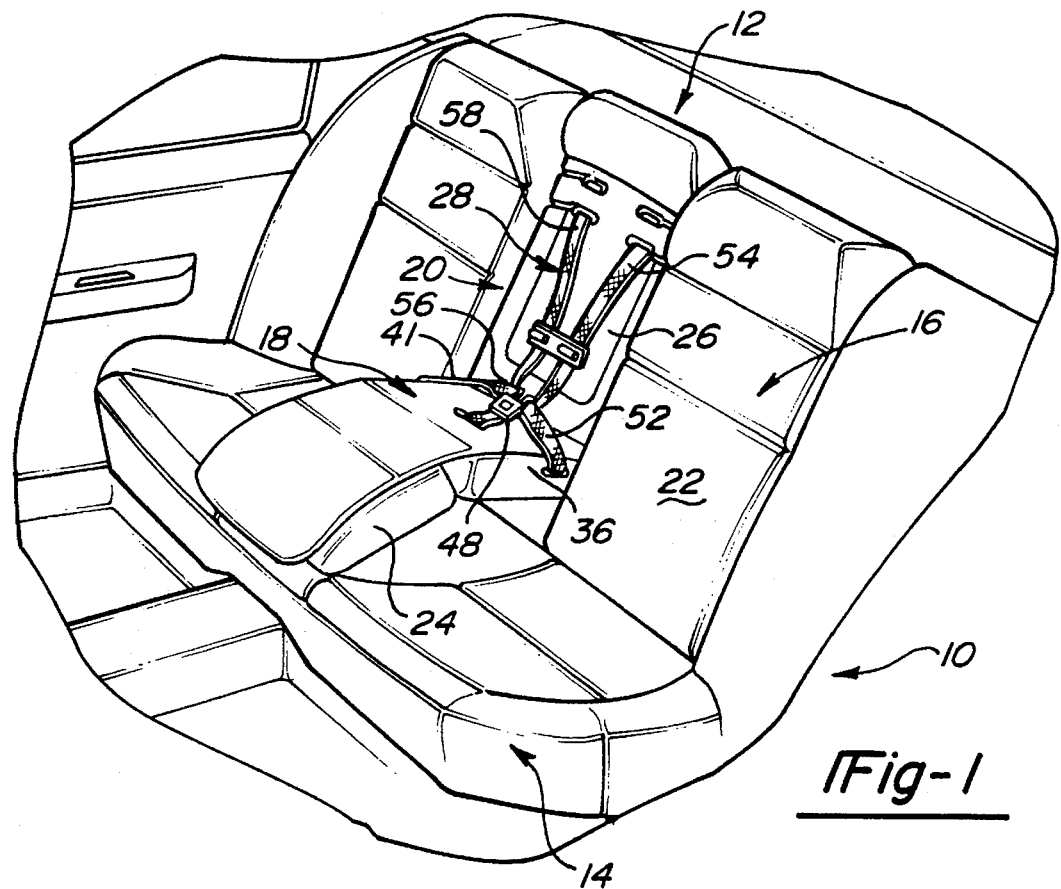
FIG. 1 is a perspective view showing a vehicle bench seat assembly with an integral child seat having the belt anchor of the present invention.
Figure 3:
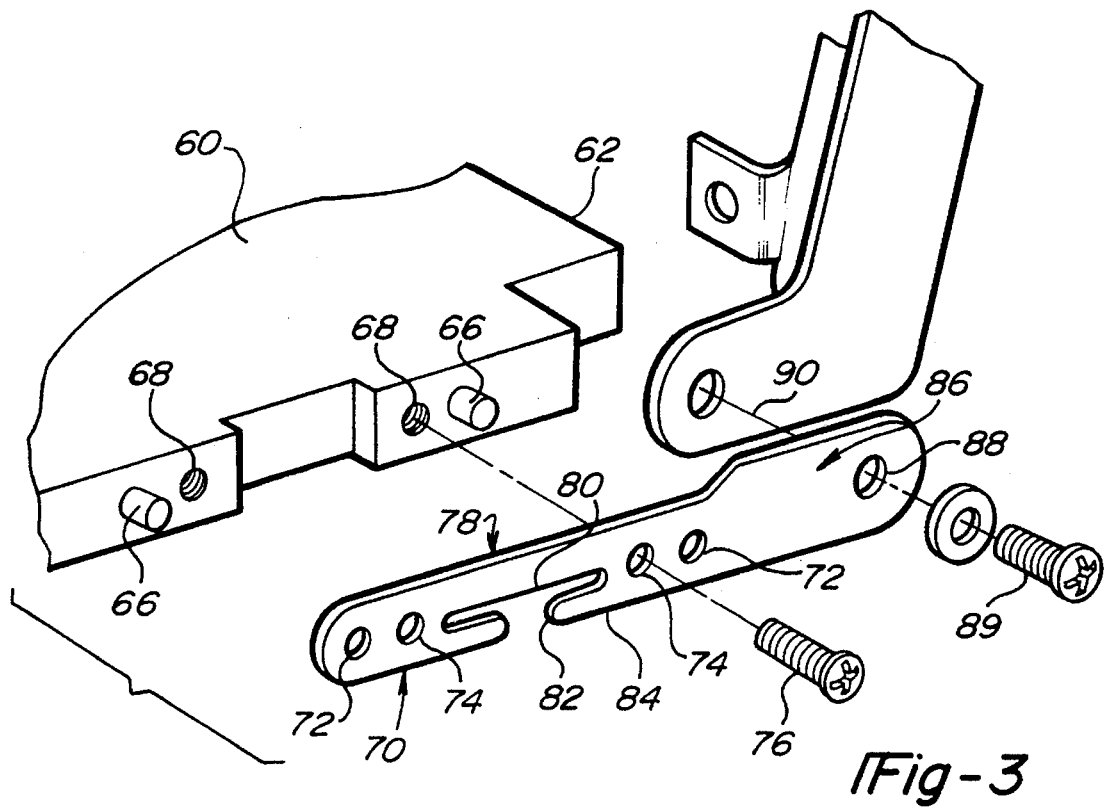
FIG. 3 is an exploded fragmentary view of the seat pan and belt anchor.

Vehicle seat assembly 10 shown in FIG. 1 includes an integral child seat 12 having the belt anchor of the present invention. Seat assembly 10 includes a seat cushion 14 and a seat back 16.

The child seat 12 includes a lower seat support 18 which is shown in a generally horizontal, forwardly extending position in FIG. 1. The seat support 18 is rotatably mounted to the seat back 16 and can be rotated from the use position shown, to an upright position stowed within the cavity 20 in the seat back 16. When in the stowed position, the seat support 18 forms a portion of the front seating surface 22 of the seat back. Positioned forward of the seat support 18 is a footrest 24 which is flexibly attached to the seat support and which also has a stowed position within the cavity 20, above the seat support 18. When the seat support and leg rest are in their use positions, a child seat back support 26 is revealed, which is the back of the cavity 20 and which is recessed rearward from the front seating surface 22 of the seat back 16. The back support 26 and lower seat support are covered with connected upholstered pads 23, 25. The back support 26 also includes a back panel 27 attached to the seat back frame brackets 29, 31. A child restraint system 28 is also revealed when the seat support is in the use position.

Figure 2:
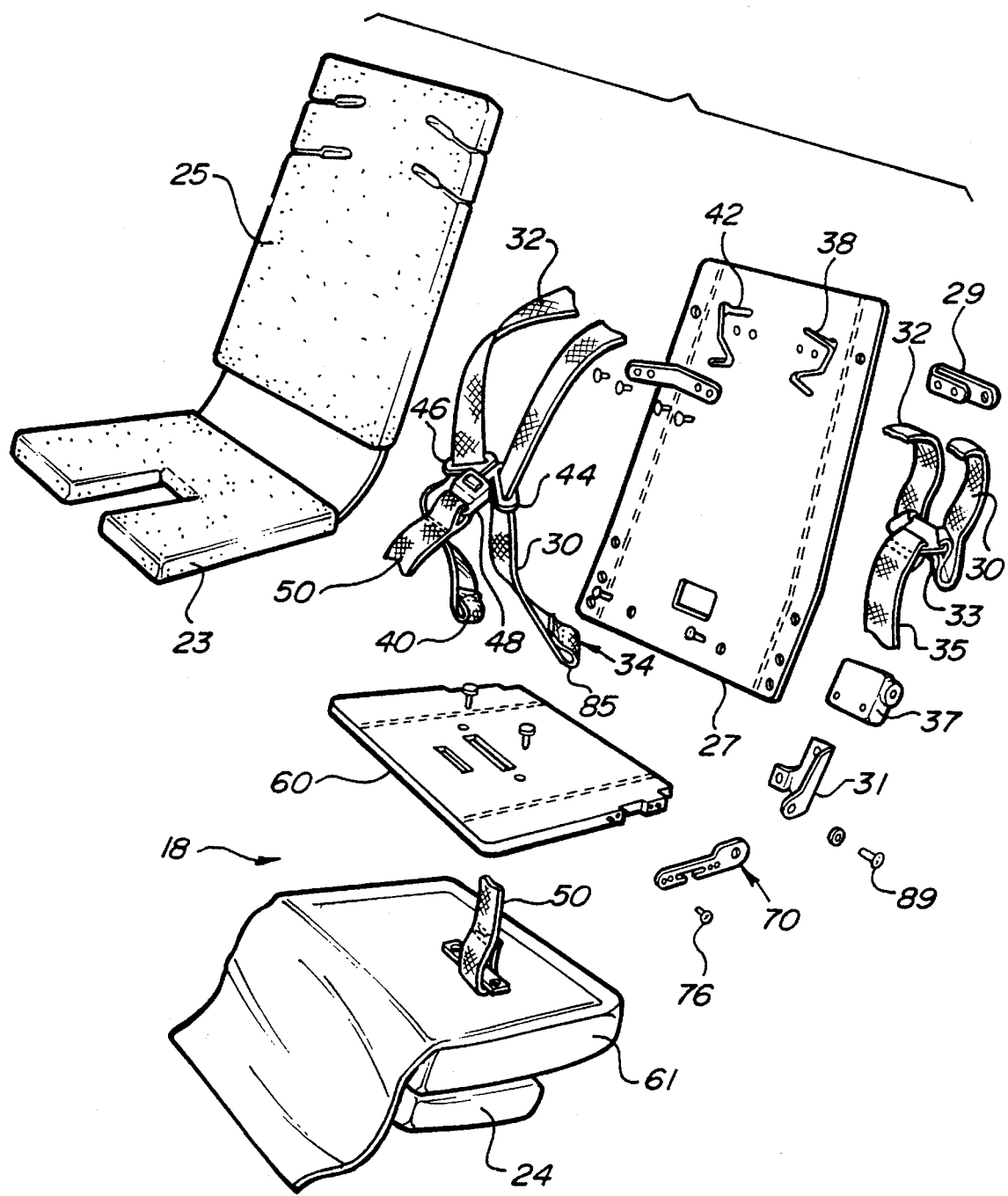
FIG. 2 is an exploded perspective view of the child seat belt restraint system.

The child restraint system 28 is shown in greater detail in FIG. 2 and includes a pair of belts, left belt 30 and right belt 32. The left belt has a first end 34 which is attached to the left side 36 of the seat support 18. From the seat support, the left belt 30 extends upwardly toward the upper end of the back support 26 and passes rearwardly through a slot 38 in the back support. Likewise, the right belt 32 has a first end 40 which is attached to the right side 41 of the seat support 18 and extends upwardly over the back support and passes through a slot 42 near the upper end of the back support. Once the belts pass through the back panel 27, they extend downward to a connector 33. A single belt 35 extends from the connector 33 to a retractor 37, or other belt length adjustment device, attached to the back panel 27.

Left and right clasps 44, 46 are slidably carried on the left and right belts 30, 32, respectively. A buckle 48 is attached to the lower seat support 18 midway between the left and right sides and is located so as to be positioned between the legs of a seat occupant. The buckle 48 is coupled to the seat support 18 through a short piece of webbing 50. When the clasps 44, 46 are inserted into the buckle 48, the left belt 30 forms a lap belt 52 extending over the left leg of the seat occupant and a shoulder belt 54 extending from the buckle to the slot 38 over the shoulder of a seat occupant. Likewise, the right belt 32 forms a lap belt 56 extending over the right leg of the seat occupant and a shoulder belt 58 extending from the buckle to the slot 42 over the right shoulder of a seat occupant.

The seat support 18 is formed of a seat pan 60 attached to a cushion 61. The pan 60 can be made of a variety of materials and by a variety of manufacturing methods. In a preferred embodiment, the seat pan 60 is made up of a molded thermal plastic resin which is both inexpensive to produce and is light weight. The pan can also be made simply of stamped steel. A pair of projecting alignment posts 66 extend from the sides of the seat pan, near the pan rear end 62. Adjacent the posts 66 are a pair of apertures 68. A seat belt anchor 70 made of sheet metal includes a pair of alignment apertures 72 and attachment apertures 74. The anchor 70 is attached to the seat pan 60 by first placing the anchor on the side of the pan with the alignment posts 66 extending through the alignment apertures 72. This properly positions the anchor on the pan. Fasteners 76, such as rivets, screws or nut and bolt assemblies, are inserted through the apertures 74 in the anchor and the apertures 68 in the pan to attach the anchor to the pan. The alignment posts 66 are only provided as an assembly aid.

The anchor 70 has a belt attachment portion 78 between the spaced attachment apertures 74. The belt attachment portion consists of a slot 80 for the belt. An entrance passage 82 extends from the bottom periphery 84 of the anchor to the slot 80. The belt has a loop 85 at its end which is inserted into the slot 80 through the entrance passage 82.

The anchor 70 includes a rearwardly extending mounting portion 86. The mounting portion includes a single aperture 88 and is used to mount the lower seat support 18 to the seat back 16 with fastener 89 for rotation about pivot axis 90. A pair of anchors 70 are used, one on each side of the lower seat support, one for each of the belts 30, 32. By integrating the anchors 70 with the hinge for mounting the lower seat support to the seat back, the belt load path does not pass through the seat pan 60. This reduces the load on the seat pan, allowing it to be made of lower strength materials. Alternatively, the seat pan 60 could be made of high strength materials with sufficient load carrying capability to support the seat belt loading, in which case, separate belt anchors would not be needed and the belt could be attached directly to the seat pan 60.

Figure 4:
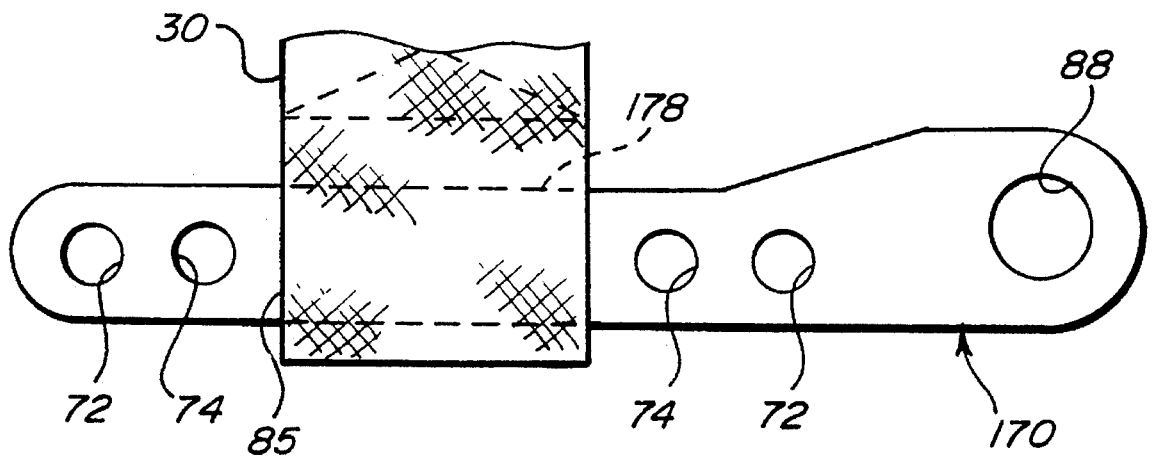
FIGS. 4 and 5 are plan views of alternative belt anchor configurations.

An alternative configuration for the belt anchor is shown in FIG. 4 and is designated as 170. Anchor 170 is identical to the anchor 70 except with respect to the belt attaching portion 178. The belt attaching portion 178 does not include a slot, but rather is a solid bar. The loop at the belt end is wrapped around the anchor 170 between the spaced attachment apertures 74. With this anchor, the fasteners 76 are necessary to ensure mounting of the belt to the anchor. If the fastener 76 in front of the belt failed, the belt would be free to move forward, off the anchor.

Figure 5:
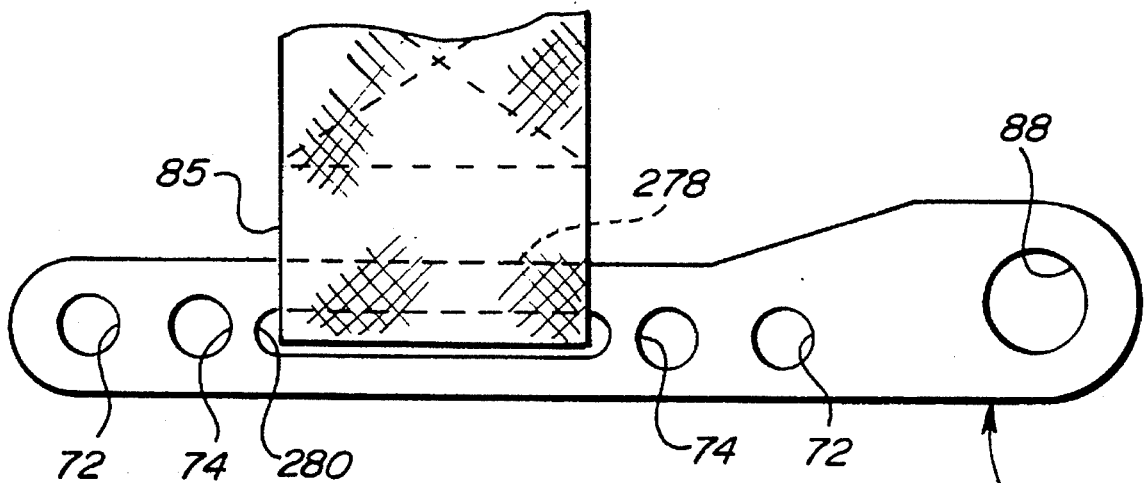

A third embodiment of the anchor is shown in FIG. 5 and labeled as 270. The difference between anchor 270 and anchors 70 and 170 is the belt attachment portion 278 between the two apertures 74. The belt attachment portion 278 consists of a closed slot 280 without an entrance passage leading to the periphery of the anchor. The end of the belt is attached to the anchor 270 by first routing the belt through the slot 280 and then sewing the belt to form the loop 85.

The seat support 18 includes two anchors, one on each of the left and right sides 36, 41 for attachment of the left and right belts 30, 32, respectively. By attaching the belts to the lower seat support 18, the belt ends will move with the seat support as the seat support is rotated between its stowed and use positions. Furthermore, by attaching the belts to the lower seat support forward of the seat support pivot axis 90, the belts will wrap over the seat occupant's legs and extend downward to the side of the seat support. This will help prevent the belt from riding over the iliac crest of the seat occupant's pelvis, transmitting belt loads to the pelvis rather than the soft abdominal tissue above the pelvis.

It is to be understood that the invention is not limited to the exact construction illustrated and described above, but that various changes and modifications may be made without departing from the spirit and scope of the invention as defined in the following claims.

We claim:

1. A vehicle seat assembly having a seat back with an integral child seat, said child seat comprising:

a back support with upper and lower ends mounted to said seat back;

a seat support rotatably mounted to said seat back for rotation about a pivot axis adjacent to said lower end of said back support, said seat support being movable between an upright position stowed within said seat back and a forwardly extending, generally horizontal use position, said seat support having spaced apart left and right opposite sides;

a restraint system operatively connected between said back support and said seat support to restrain a passenger having legs positioned on the seat support and said back support, said restraint system including left and right belts each having a first end connected to said seat support at said left and right sides thereof, respectively, at locations spaced from said pivot axis so that said first ends of said belts rotate with said seat support, said belts extending upwardly from said seat support, overlying said back support and passing into said back support near the upper end thereof, a buckle mounted to said seat support midway between said left and right sides so as to be located between the legs of a passenger positioned on the seat support and left and right clasps slidably carried on said left and right belts, respectively, for insertion into said buckle;

said seat support including a seat pan having left and right sides and left and right belt anchors attached to said seat pan at said left and right sides thereof, respectively, for attaching said first ends of said left and right belts to said seat support; and said seat further comprising means for pivotally mounting said anchors to said seat back whereby said seat support is mounted to said seat back.

2. The seat of claim 1 wherein each said anchor is generally planar with two spaced apart apertures for attaching each said anchor to said seat pan and with a belt attachment portion disposed between said two spaced apart apertures for attachment of one of said belts to each said anchor.

3. The seat of claim 2 wherein said belt attachment portion includes a closed slot through which said belt is routed to attach said belt to said anchor.

4. The seat of claim 2 wherein said belt attachment portion includes a slot through which one of said belts is routed to attach said belt to said plate, and an entrance passage extending from said slot to a lower edge of said anchor through which said belt is passed to position said belt in said slot.

5. The seat of claim 2 wherein said belt attachment portion is solid and about which said belt is wrapped to attach said belt to said anchor.

6. The seat of claim 2 wherein said means for pivotally mounting said anchors to said seat back is disposed rearward of said belt attachment portion of each said anchor.

7. A vehicle seat assembly having a seat back with an integral child seat, said child seat comprising:

a back support with upper and lower ends mounted to said seat back;

a seat support rotatably mounted to said seat back for rotation about a pivot axis adjacent to said lower end of said back support between a position stowed within said seat back and a forwardly extending, generally horizontal use position, said seat support including a seat pan having spaced apart left and right opposite sides and left and right belt anchors attached to said left and right sides, respectively, said anchors including mounting portions for pivotally mounting said anchors to said seat back whereby said seat support is mounted to said seat back; and a restraint system operatively connected between said back support and said seat support to restrain a passenger positioned on said seat support and said back support, said restraint system including left and right belts each having a first end connected to said left and right belt anchors, respectively, at said left and right sides of said seat pan.

8. The seat of claim 7 wherein said anchors include a pair of spaced alignment apertures and said seat pan includes a pair of spaced alignment posts on each side for alignment of said belt anchors on said seat pan by placing said belt anchors on said seat pan with said alignment posts projecting through said spaced alignment apertures.

9. A child seat contained within a vehicle seat assembly, said child seat comprising:

a lower seat support having left and right sides and a rear end rotatably mounted to the vehicle seat assembly for rotation about a pivot axis adjacent said rear end between a stowed position and a use position, said lower seat support forming a seating surface upon which a child can be seated when in said use position;

left and right seat belt anchor brackets attached to said left and right sides of said lower seat support, respectively, said anchor brackets including rear mounting portions for pivotally mounting said anchors to said seat assembly whereby said lower seat support is mounted to said seat assembly and said anchors each including a belt attaching portion spaced forward of said rear mounting portion;

a back support mounted to the vehicle seat assembly forming a back surface upon which a child can be seated; and a restraint system for restraining a child seated upon said lower seat support and said back support, said restraint system including a buckle attached to said lower seat support at a location disposed between the legs of a child seat occupant and forward of said pivot axis, left and fight belts operatively coupled to said belt attaching portions of said seat belt anchor brackets at said left and right sides respectively, and clasps on said belts insertable into said buckle forming lap belts that extend from said buckles to said left and right sides of said lower seat support, said belt attaching portions of said anchors being located forward of said pivot axis and transversely of said buckle whereby said belts extend substantially transversely from said buckle, over the legs of a child seat occupant, to said left and right sides of said lower seat support.

* * * * *